US012579045B2

(12) United States Patent
Ham

(10) Patent No.: US 12,579,045 B2
(45) Date of Patent: Mar. 17, 2026

(54) DATA COMMUNICATION USING OPTICAL UART LINKS

(71) Applicant: SK Hynix NAND Product Solutions Corp., Rancho Cordova, CA (US)

(72) Inventor: Hoeun Ham, Folsom, CA (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 0 days.

(21) Appl. No.: 18/649,849

(22) Filed: Apr. 29, 2024

(65) Prior Publication Data

US 2025/0004899 A1      Jan. 2, 2025

Related U.S. Application Data

(63) Continuation of application No. 18/217,347, filed on Jun. 30, 2023.

(51) Int. Cl.
*G06F 11/00* (2006.01)
*G06F 11/30* (2006.01)
*G06F 11/362* (2025.01)

(52) U.S. Cl.
CPC ...... *G06F 11/3037* (2013.01); *G06F 11/3075* (2013.01); *G06F 11/3656* (2013.01)

(58) Field of Classification Search
CPC ............. G06F 11/3037; G06F 11/3075; G06F 11/3656
See application file for complete search history.

(56) References Cited

U.S. PATENT DOCUMENTS

| | | | |
|---|---|---|---|
| 8,769,362 B2 * | 7/2014 | Chou .................... | H04B 10/801 714/25 |
| 10,948,970 B2 | 3/2021 | Moschopoulos et al. | |
| 11,507,148 B2 | 11/2022 | Lee et al. | |
| 2007/0237527 A1 | 10/2007 | Dabral et al. | |
| 2007/0283191 A1 | 12/2007 | McDonald-Maier et al. | |
| 2010/0161840 A1 | 6/2010 | McCollum | |

(Continued)

FOREIGN PATENT DOCUMENTS

CN          116166562 A   *   5/2023

OTHER PUBLICATIONS

SK Hynix NAND Product Solutions Corp. (dba Solidigm), PCT/US2024/035365, International Search Report and Written Opinion, Oct. 16, 2024, 9 pgs.

*Primary Examiner* — Amine Riad
(74) *Attorney, Agent, or Firm* — Morgan, Lewis & Bockius LLP

(57) ABSTRACT

This application is directed to communicating telemetry and debugging data of a memory system using optical signals. An enclosed memory device has an optical indicator and receives a data request. In response to the data request, the enclosed memory device obtains internal activity data stored in the memory device, encodes the internal activity data into an electrical signal, and drives the optical indicator with the electrical signal to generate a visible light signal carrying the internal activity data. In some embodiments, the enclosed memory device includes a solid-state drive. In some embodiments, the internal activity data includes telemetry data stored by the enclosed memory device while the memory device is processing a sequence of memory access requests including at least one of a read request and a write request.

20 Claims, 6 Drawing Sheets

(56) References Cited

U.S. PATENT DOCUMENTS

| 2013/0283098 | A1 | 10/2013 | Chou et al. |
| 2020/0013476 | A1 | 1/2020 | Konan et al. |
| 2022/0269886 | A1 | 8/2022 | Wu et al. |
| 2025/0004898 | A1 | 1/2025 | Ham |

* cited by examiner

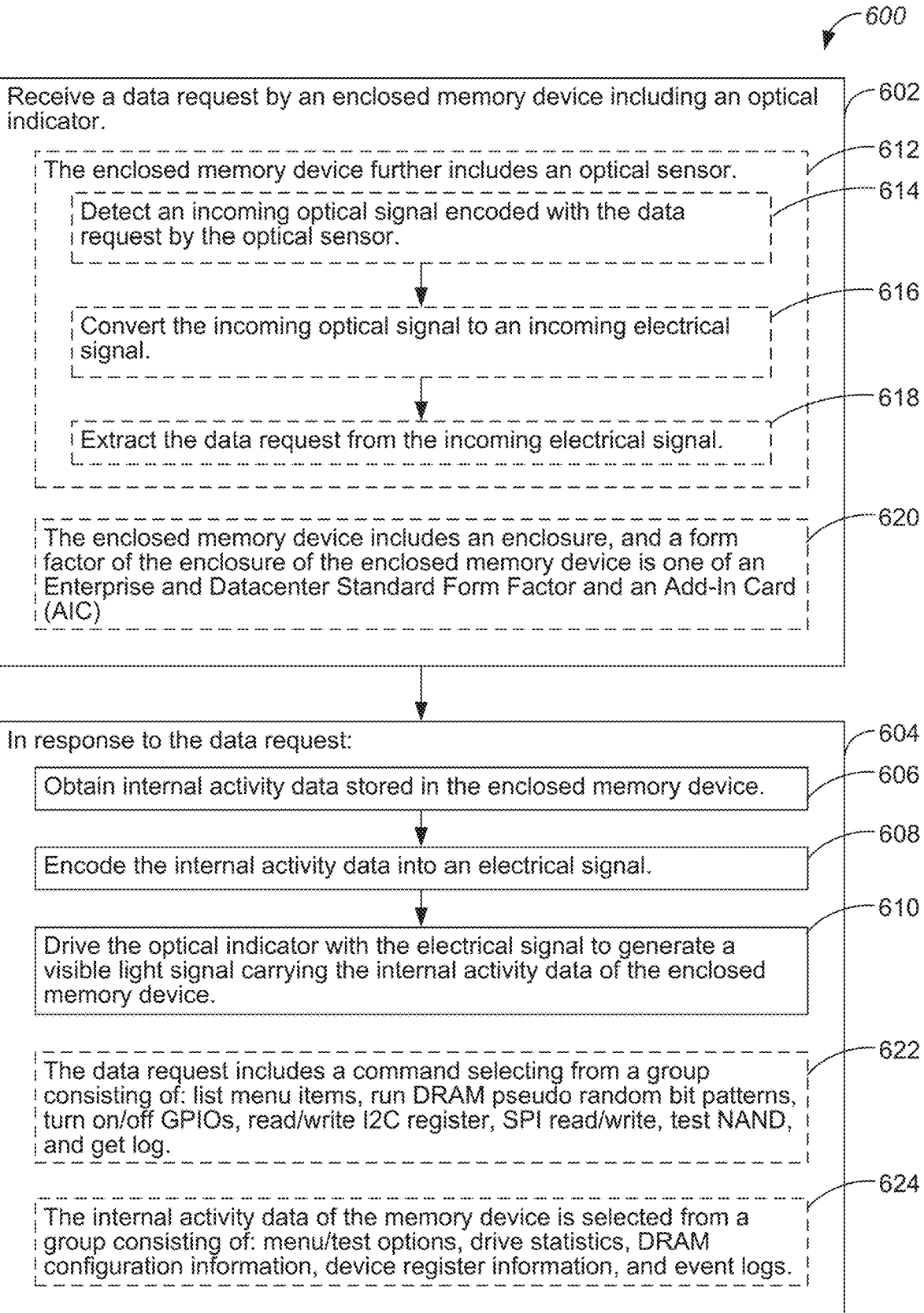

600

Receive a data request by an enclosed memory device including an optical indicator. ⌐602

The enclosed memory device further includes an optical sensor. ⌐612

Detect an incoming optical signal encoded with the data request by the optical sensor. ⌐614

Convert the incoming optical signal to an incoming electrical signal. ⌐616

Extract the data request from the incoming electrical signal. ⌐618

The enclosed memory device includes an enclosure, and a form factor of the enclosure of the enclosed memory device is one of an Enterprise and Datacenter Standard Form Factor and an Add-In Card (AIC) ⌐620

In response to the data request: ⌐604

Obtain internal activity data stored in the enclosed memory device. ⌐606

Encode the internal activity data into an electrical signal. ⌐608

Drive the optical indicator with the electrical signal to generate a visible light signal carrying the internal activity data of the enclosed memory device. ⌐610

The data request includes a command selecting from a group consisting of: list menu items, run DRAM pseudo random bit patterns, turn on/off GPIOs, read/write I2C register, SPI read/write, test NAND, and get log. ⌐622

The internal activity data of the memory device is selected from a group consisting of: menu/test options, drive statistics, DRAM configuration information, device register information, and event logs. ⌐624

Figure 6

DATA COMMUNICATION USING OPTICAL UART LINKS

RELATED APPLICATION

This application is a continuation of U.S. patent application Ser. No. 18/217,347, filed Jun. 30, 2023, titled "UART Communication of Telemetry and Debugging Data Using Optical Signals," which is incorporated by reference in its entirety.

TECHNICAL FIELD

This application relates generally to semiconductor packaging technology including, but not limited to, methods, systems, and devices for communicating telemetry and debugging data of a memory system using optical signals.

BACKGROUND

Memory is applied in a computer system to store instructions and data, and the data are processed by one or more processors according to the instructions stored in the memory. The one or more processors are further coupled to secondary memory (e.g., hard disk drives (HDDs) or solid-state drives (SSDs)), which is non-volatile memory that keeps data stored thereon when the computing decoupled from a power source. The secondary memory is often individually packaged in a memory enclosure and integrated in the computer system. Such a secondary memory normally exchanges data with a host device of the computer system or debugging equipment via wired connections. The wired connections require one or more cutouts on the memory enclosure. Any of these cutouts can expose internal electronics of the secondary memory to strong electromagnetic interference (EMI) created locally around the cutout. Particularly, EMI generated by electrostatic discharge (ESD) events are strong and problematic to electronic components in SSDs. Small cutouts are generally preferred because they limit EMI to a range of frequencies, and however, part of the frequency range still includes SSD's operating frequencies. Additionally, each wired connection uses physical features to provide sufficient mechanical robustness, and these physical features take up valuable space along an edge of the memory enclosure and causes EMI in an undesirable manner. It would be beneficial to develop a data communication mechanism for the secondary memory (e.g., HDDs, SSDs) to communicate data into or out of a memory enclosure conveniently, efficiently, and reliably.

SUMMARY

Various embodiments of this application are directed to methods, systems, and devices for communicating data (e.g., telemetry and debugging data) of a memory device 200 using optical signals. For example, light emitting diodes (LEDs) are applied in SSDs to communicate encoded universal asynchronous receiver/transmitter (UART) information for telemetry or debugging messages from an SSD. An optical transceiver device is coupled to a computing device, and configured to communicate with an SSD via visible light that is emitted by the LEDs of the SSD or by one or more LED(s) of the optical transceiver device. The data is encoded in an optical signal generated by an LED and having a fast data rate (e.g., >500 Hz, tens of kHz). Independently of capabilities of human eyes, the optical signal is detected by an optical detector, allowing the LEDs to transmit debugging data (e.g., logs and device status). Additionally, light-based data communication relies on a functionality of the LEDs and does not require a wired UART connector. The LEDs do not create large cutouts on an enclosure of the memory device 200 compared with the wired UART connector, and protects the memory device from EMI. Compared with other wireless data communications (e.g., NFC, Zigbee, Bluetooth, or WiFi), a complexity level of the LEDs and associated optical driver is manageable without incurring additional power requirements or EMI considerations. LED light is directional along a line of sight, providing a level of data security. As such, various embodiments of this application provides a light based data communication mechanism for a memory system (e.g., HDDs, SSDs) to communicate data into or out of a memory enclosure conveniently, efficiently, and reliably.

In one aspect, a method is implemented to communicate data of a memory system. The method includes receiving a data request by an enclosed memory device including an optical indicator. The methods further includes in response to the data request, obtaining internal activity data stored in the memory device, encoding the internal activity data into an electrical signal, and driving the optical indicator with the electrical signal to generate a visible light signal carrying the internal activity data. In some embodiments, the enclosed memory device includes a solid-state drive. In some embodiments, the internal activity data includes telemetry data stored by the enclosed memory device while the memory device is processing a sequence of memory access requests including at least one of a read request and a write request.

In some embodiments, the data request includes a command selected from a group consisting of: list menu items, run DRAM pseudo random bit patterns, turn on/off GPIOs, read/write I2C register, SPI read/write, test NAND, and get log. In some embodiments, the internal activity data of the memory is selected from a group consisting of: menu/test options, drive statistics, DRAM configuration information, device register information, and event logs. Further, in some embodiments, the internal activity data of the memory includes one or more of: drive temperature, drive health data, and error information.

In another aspect, some implementations are directed to a memory storage system that includes an enclosure, a plurality of memory cells, a memory controller, an optical driver, an optical indicator, and one or more programs configured for execution by the memory controller. The one or more programs include instructions for receiving a data request and in response to the data request, obtaining internal activity data stored in the memory system, coding the internal activity data into an electrical signal, and driving the optical indicator with the electrical signal to generate a visible light signal carrying the internal activity data.

In yet another aspect, some implementations are directed to an electronic system including a memory system. The memory system has an enclosure, a plurality of memory cells, a memory controller, an optical driver, an optical indicator, and one or more programs configured for execution by the memory controller. The one or more programs include instructions for receiving a data request and in response to the data request, obtaining internal activity data stored in the memory system, coding the internal activity data into an electrical signal, and driving the optical indicator with the electrical signal to generate a visible light signal carrying the internal activity data.

These illustrative embodiments and implementations are mentioned not to limit or define the disclosure, but to provide examples to aid understanding thereof. Additional embodiments are discussed in the Detailed Description, and further description is provided there.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

FIG. 6 is a flow diagram of an example method of communicating data in an enclosed memory device having an optical indicator, in accordance with some embodiments.

Like reference numerals refer to corresponding parts throughout the several views of the drawings.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

Figure 1:
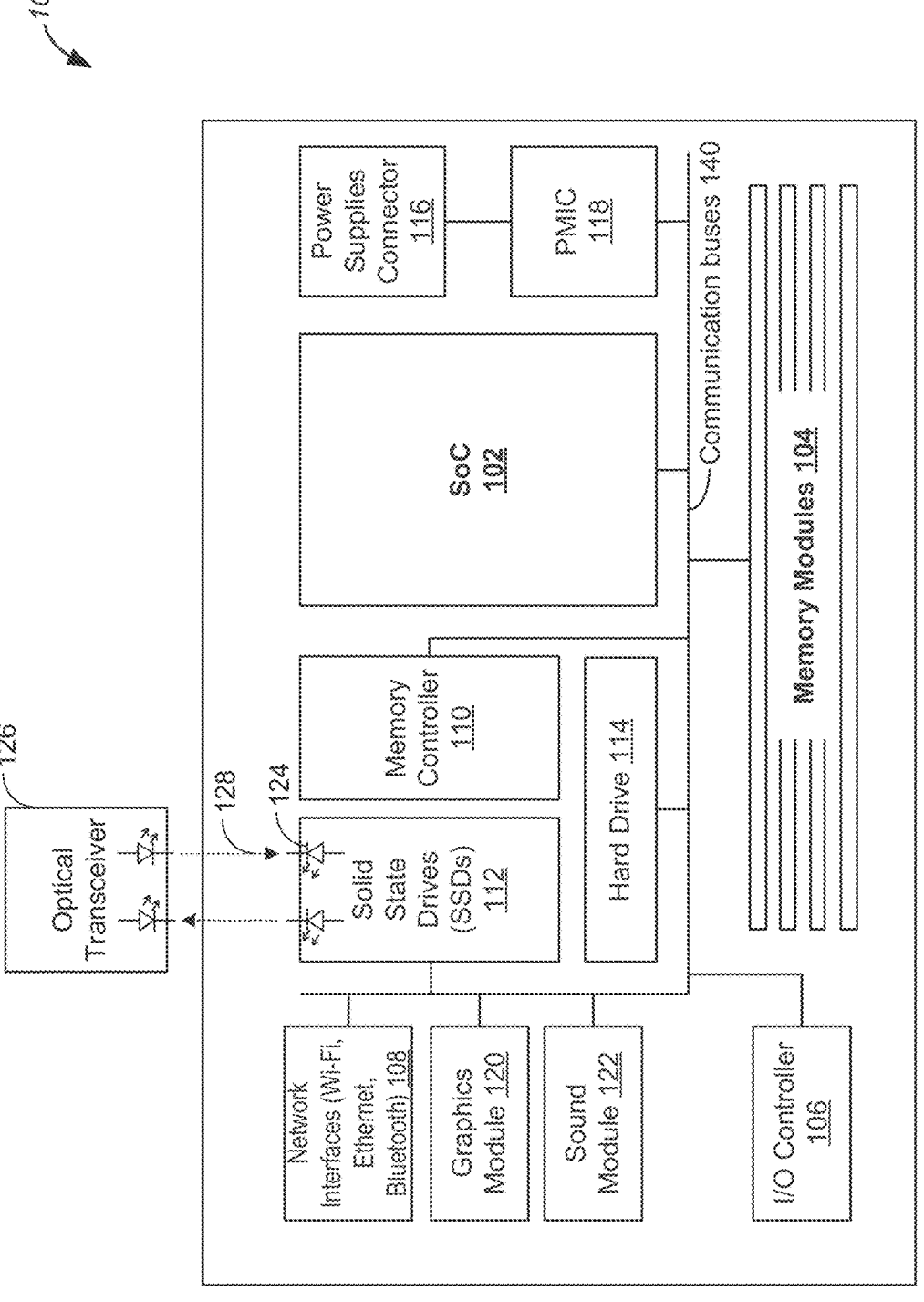
FIG. 1 is a block diagram of an example system module in a typical electronic device in accordance with some embodiments.

FIG. 1 is a block diagram of an example system module 100 in a typical electronic device in accordance with some embodiments. The system module 100 in this electronic device includes at least a processor module 102, memory modules 104 for storing programs, instructions and data, an input/output (I/O) controller 106, one or more communication interfaces such as network interfaces 108, and one or more communication buses 140 for interconnecting these components. In some embodiments, the I/O controller 106 allows the processor module 102 to communicate with an I/O device (e.g., a keyboard, a mouse or a trackpad) via a universal serial bus interface. In some embodiments, the network interfaces 108 includes one or more interfaces for Wi-Fi, Ethernet and Bluetooth networks, each allowing the electronic device to exchange data with an external source, e.g., a server or another electronic device. In some embodiments, the communication buses 140 include circuitry (sometimes called a chipset) that interconnects and controls communications among various system components included in system module 100.

In some embodiments, the memory modules 104 include high-speed random-access memory, such as static random-access memory (SRAM), double data rate (DDR) dynamic random-access memory (DRAM), or other random-access solid state memory devices. In some embodiments, the memory modules 104 include non-volatile memory, such as one or more magnetic disk storage devices, optical disk storage devices, flash memory devices, or other non-volatile solid state storage devices. In some embodiments, the memory modules 104, or alternatively the non-volatile memory device(s) within the memory modules 104, include a non-transitory computer readable storage medium. In some embodiments, memory slots are reserved on the system module 100 for receiving the memory modules 104. Once inserted into the memory slots, the memory modules 104 are integrated into the system module 100.

In some embodiments, the system module 100 further includes one or more components selected from a memory controller 110, solid state drives (SSDs) 112, a hard disk drive (HDD) 114, power management integrated circuit (PMIC) 118, a graphics module 120, and a sound module 122. The memory controller 110 is configured to control communication between the processor module 102 and memory components, including the memory modules 104, in the electronic device. The SSDs 112 are configured to apply integrated circuit assemblies to store data in the electronic device, and in many embodiments, are based on NAND or NOR memory configurations. The HDD 114 is a conventional data storage device used for storing and retrieving digital information based on electromechanical magnetic disks. The power supply connector 116 is electrically coupled to receive an external power supply. The PMIC 118 is configured to modulate the received external power supply to other desired DC voltage levels, e.g., 5V, 3.3V or 1.8V, as required by various components or circuits (e.g., the processor module 102) within the electronic device. The graphics module 120 is configured to generate a feed of output images to one or more display devices according to their desirable image/video formats. The sound module 122 is configured to facilitate the input and output of audio signals to and from the electronic device under control of computer programs.

It is noted that communication buses 140 also interconnect and control communications among various system components including components 110-122.

Further, one skilled in the art knows that other non-transitory computer readable storage media can be used, as new data storage technologies are developed for storing information in the non-transitory computer readable storage media in the memory modules 104 and in SSDs 112. These new non-transitory computer readable storage media include, but are not limited to, those manufactured from biological materials, nanowires, carbon nanotubes and individual molecules, even though the respective data storage technologies are currently under development and yet to be commercialized.

Some implementations of this application are directed to communicating data of a memory system (e.g., SSD 112) using an optical signal. One or more LEDs 124 are integrated on an enclosure of the memory system and applied to transmit and receive encoded UART information for telemetry or to gather debugging messages from the memory system. The one or more LEDs 124 of the memory system function with an optical transceiver 126 connected to a computing system to form a wireless optical communication link 128. The wireless optical communication link 128 replaces a wired debug connector of the memory system that is configured to mate to an external wired debugger of the optical transceiver 126, thereby enabling a wireless means for debugging or gathering information from an SSD 112 using the LEDs 124. The LEDs 124 optionally already exist on an SSD enclosure (i.e., Enterprise and Data Center Standard Form Factor (EDSFF) or add-in card (AIC)) or are added to an SSD 112. The wireless optical communication link 128 incurs no or little additional hardware cost, and requires minimal addition of hardware for form factors that already have LEDs as part of its specifications. In some embodiments, each LED corresponds to an aperture where the light comes through, and the aperture is substantially small (e.g., has a diameter of 3-5 millimeters), thereby protecting the SSD from strong EMI. In some embodiments, the external wired debugger of the optical transceiver 126 is clipped onto the SSD enclosure or a server chassis. In some situations, the optical transceiver 126 is placed a distance away from the SSD 112 while still being able to talk to the SSD 112. Further, in some embodiments, a sliding door or latch is implemented to expose the LEDs when the LEDs are in use for debugging in high EMI environments.

Figure 2:
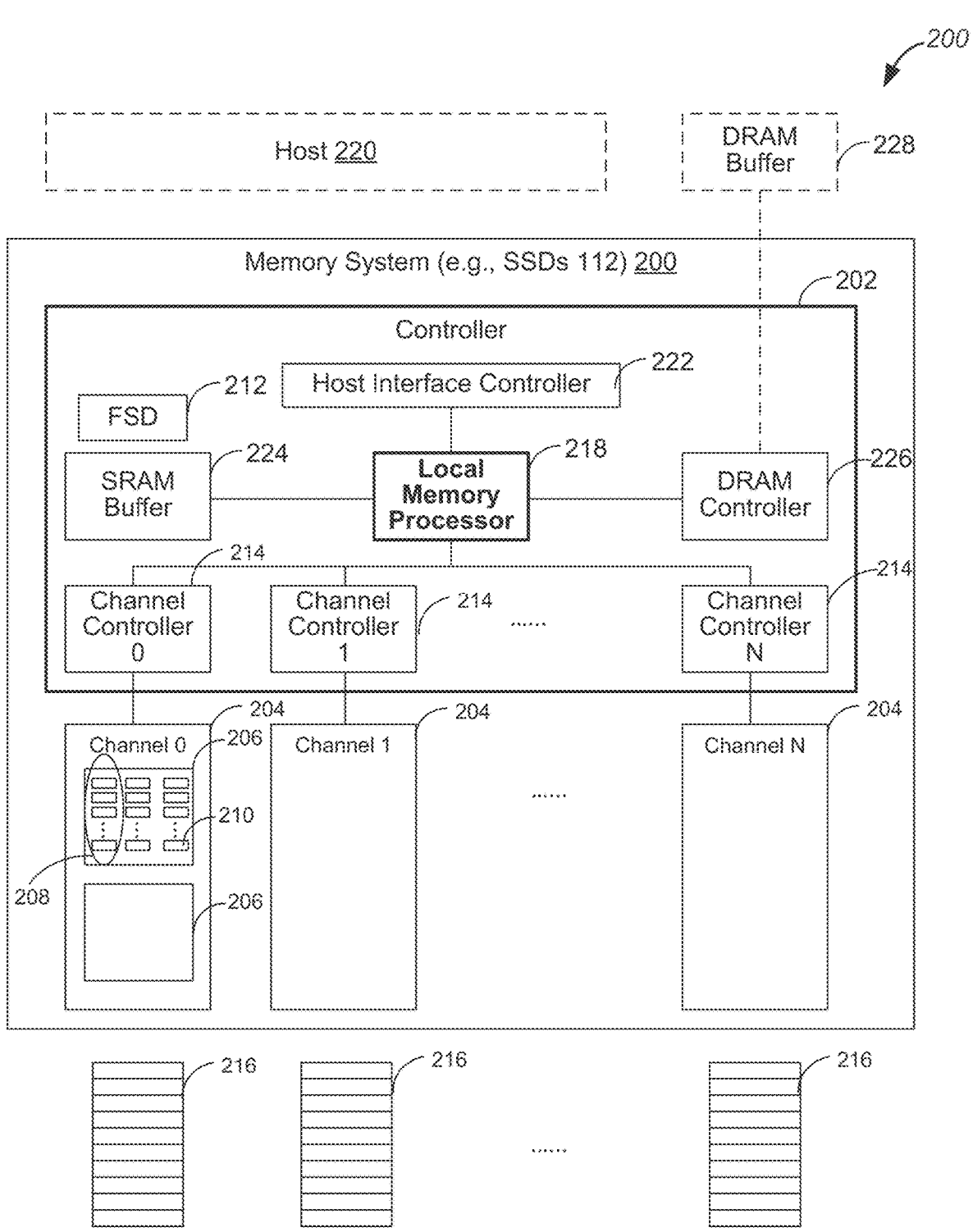
FIG. 2 is a block diagram of a memory system of an example electronic device having one or more memory access queues, in accordance with some embodiments.

FIG. 2 is a block diagram of a memory system 200 of an example electronic device having one or more memory access queues, in accordance with some embodiments. The memory system 200 is coupled to a host device 220 (e.g., a processor module 102 in FIG. 1) and configured to store instructions and data for an extended time, e.g., when the electronic device sleeps, hibernates, or is shut down. The host device 220 is configured to access the instructions and data stored in the memory system 200 and process the instructions and data to run an operating system and execute user applications. The memory system 200 further includes a controller 202 and a plurality of memory channels 204. Each memory channels 204 includes a plurality of memory cells. The controller 202 is configured to executes firmware level software to bridge the plurality of memory channels 204 to the host device 220. Specifically, the controller 202 is configured to communicate with the host device 220, manage a file system directory 212 for tracking data locations in the memory channels 204, organize the plurality of memory channels 204, and facilitate internal and external requests to access the memory channels 204.

Each memory channel 204 includes on one or more memory packages 206 (e.g., two memory chips, two memory dies). In an example, each memory package 206 corresponds to a memory die. Each memory package 206 includes a plurality of memory planes 208, and each memory plane 208 further includes a plurality of memory pages 210. Each memory page 210 includes an ordered set of memory cells, and each memory cell is identified by a respective physical address. In some embodiments, the memory system 200 includes a single-level cell (SLC) NAND flash memory chip, and each memory cell stores a single data bit. In some embodiments, the memory system 200 includes a multi-level cell (MLC) NAND flash memory chip, and each memory cell stores 2 data bits. In an example, each memory cell of a triple-level cell (TLC) NAND flash memory chip stores 3 data bits. In another example, each memory cell of a quad-level cell (QLC) NAND flash memory chip stores 4 data bits. In yet another example, each memory cell of a penta-level cell (PLC) NAND flash memory chip stores 5 data bits. In some embodiments, each memory cell can store any suitable number of data bits. Compared with the non-SLC NAND flash memory chips (e.g., MLC SSD, TLC SSD, QLC SSD, PLC SSD), the SSD that has SLC NAND flash memory chips operates with a higher speed, a higher reliability, and a longer lifespan, and however, has a lower device density and a higher price.

Each memory channel 204 is coupled to a respective channel controller 214 configured to control internal and external requests to access memory cells in the respective memory channel 204. In some embodiments, each memory package 206 (e.g., each memory die) corresponds to a respective queue 216 of memory access requests. In some embodiments, each memory channel 204 corresponds to a respective queue 216 of memory access requests. Further, in some embodiments, each memory channel 204 corresponds to a distinct and different queue 216 of memory access requests. In some embodiments, a subset (less than all) of the plurality of memory channels 204 corresponds to a distinct queue 216 of memory access requests. In some embodiments, all of the plurality of memory channels 204 of the memory system 200 corresponds to a single queue 216 of memory access requests. Each memory access request is optionally received internally from the memory system 200 to manage the respective memory channel 204 or externally from the host device 220 to write or read data stored in the respective channel 204. Specifically, each memory access request includes one of: a system write request that is received from the memory system 200 to write to the respective memory channel 204, a system read request that is received from the memory system 200 to read from the respective memory channel 204, a host write request that originates from the host device 220 to write to the respective memory channel 204, and a host read request that is received from the host device 220 to read from the respective memory channel 204.

Further, in some embodiments, a queue 216 of memory access requests includes a memory read queue that includes only system read requests, host read requests, or a combination thereof. Alternatively, in some embodiments, a queue 216 of memory access requests includes a mixed memory access queue that includes at least a write request and a read request, while the write request is optionally a system write request or a host write request and the read request is optionally a system read request or a read write request.

A memory workload of the memory system 200 includes the one or more queues 216 of memory access requests. In some embodiments, the memory workload includes a host read workload that starts with host read requests, and does not include any host write requests. The memory workload further incorporates system read requests, system write requests, or both, and the one or more queues 216 include the host read requests and one or more of: a system read request, a system write request, or a combination thereof. Alternatively, in some embodiments, the memory workload includes a host write workload, and incorporates in which the one or more queues 216 include only system write requests that starts with host write requests, and does not include any host read requests. The memory workload further incorporates system read requests, system write requests, or both, and the one or more queues 216 include the host write requests and one or more of: a system read request, a system write request, or a combination thereof. Additionally and alternatively, in some embodiments, the memory workload includes a mixed host workload further having both host read requests and host write requests, and further incorporates system read requests, system write requests, or both. The one or more queues 216 include at least a write request and a read request, while the write request is optionally a system write request or a host write request and the read request is optionally a system read request or a read write request.

It is noted that system read requests (also called background read requests or non-host read requests) and system write requests are dispatched by a memory controller to implement internal memory management functions including, but are not limited to, garbage collection, wear levelling, read disturb mitigation, memory snapshot capturing, memory mirroring, caching, and memory sparing.

In some embodiments, in addition to the FSD 212 and channel controllers 214, the controller 202 further includes a local memory processor 218, a host interface controller 222, an SRAM buffer 224, and a DRAM controller 226. The local memory processor 218 accesses the plurality of memory channels 204 based on the one or more queues 216 of memory access requests. In some embodiments, the local memory processor 218 writes into and reads from the plurality of memory channels 204 on a memory block basis. Data of one or more memory blocks are written into, or read from, the plurality of channels jointly. No data in the same memory block is written concurrently via more than one operation. Each memory block optionally corresponds to one or more memory pages. In an example, each memory block to be written or read jointly in the plurality of memory channels 204 has a size of 16 KB (e.g., one memory page). In another example, each memory block to be written or read jointly in the plurality of memory channels 204 has a size of 64 KB (e.g., four memory pages). In some embodiments, each page has 16 KB user data and 2 KB metadata. Additionally, a number of memory blocks to be accessed jointly and a size of each memory block are configurable for each of the system read, host read, system write, and host write operations.

In some embodiments, the local memory processor 218 stores data to be written into, or read from, each memory block in the plurality of memory channels 204 in an SRAM buffer 224 of the controller 202. Alternatively, in some embodiments, the local memory processor 218 stores data to be written into, or read from, each memory block in the plurality of memory channels 204 in a DRAM buffer 228 that is in memory system 200. Alternatively, in some embodiments, the local memory processor 218 stores data to be written into, or read from, each memory block in the plurality of memory channels 204 in a DRAM buffer 228 that is main memory used by the processor module 102 (FIG. 1). The local memory processor 218 of the controller 202 accesses the DRAM buffer 228 via the host interface controller 222.

Internal activity data is created by the memory system 200 to provide information of memory accesses, system state, or access and operation errors. In some embodiments, while the controller 202 is processing a sequence of memory access requests including at least one of a read request and a write request, an event log is created and stored by the memory system 200 to track the memory access requests. The internal activity data includes a memory health log page providing general health information of the memory system 200 or a system event log page of system events (e.g., firmware updating, system formatting). Alternatively, in some embodiments, a memory access error occurs in response to a memory access request, and data is created and stored for error reporting, logging, management, and debugging. The internal activity data includes an error log page and a telemetry log page. The error log page optionally identifies the number of errors, which queue the error came from, and which data and namespaces were affected. The telemetry log page optionally provides additional information to identify a root cause of the memory access error. In some embodiments, the internal activity data of the memory system 200 is selected from a group consisting of: menu/test options, drive statistics, DRAM configuration information, and device register information. In an example, the internal activity data of the memory system 200 includes drive temperature.

Figure 3:
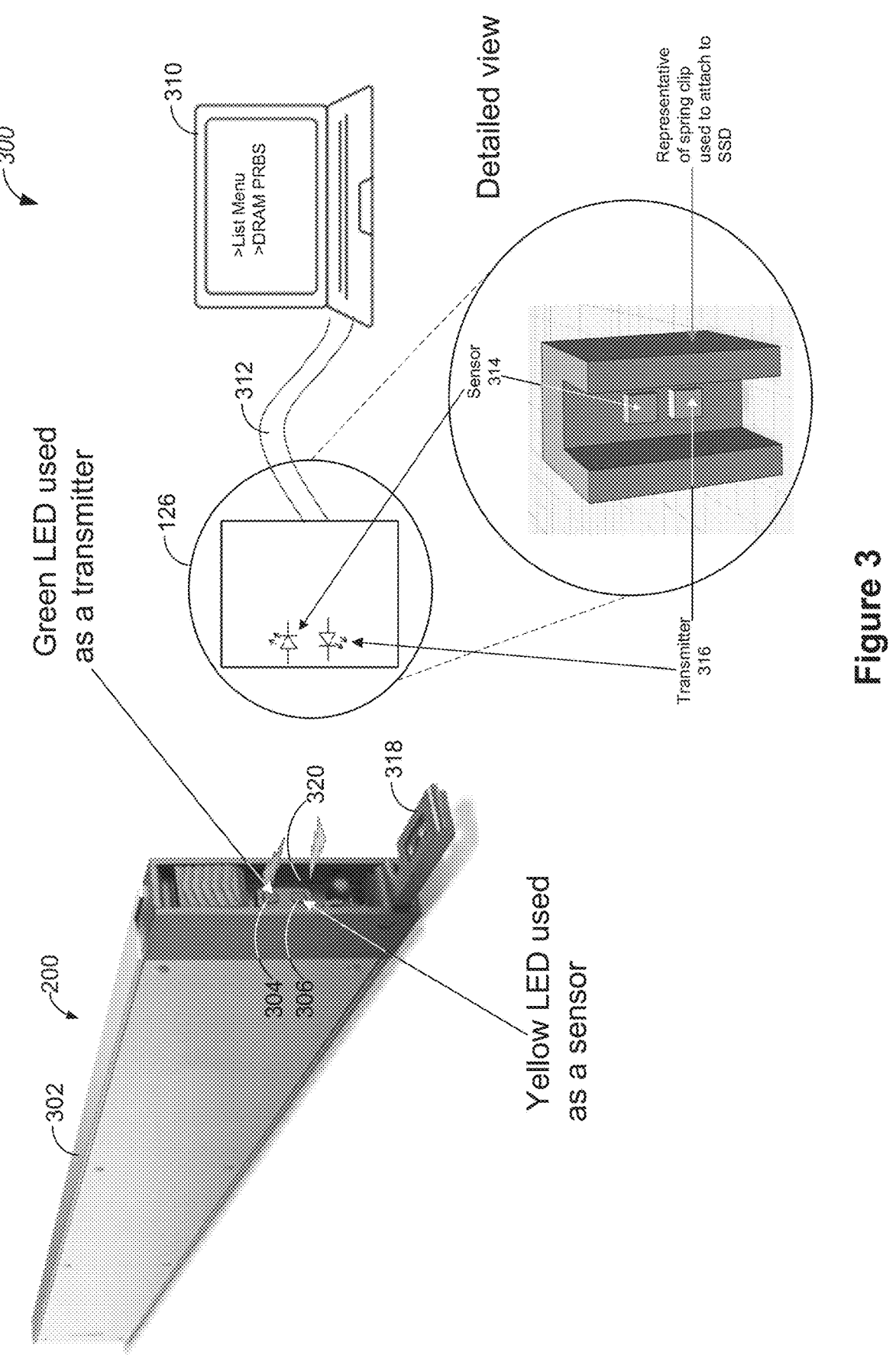
FIG. 3 is a block diagram of an example electronic system that communicates data of a memory system using optical signals, in accordance with some embodiments.

FIG. 3 is a block diagram of an example electronic system 300 that communicates data of a memory system 200 using optical signals, in accordance with some embodiments. The electronic system 300 includes a memory system 200 having an enclosure 302. The memory system 200 further includes a plurality of memory cells, a memory controller 202, and an optical driver, all of which are enclosed within the enclosure 302. The memory system 200 further includes one or more optical indicators 304 that are exposed on the enclosure 302, e.g., via an aperture 320 of the enclosure 302. In an example, the one or more optical indicators 304 includes a green LED used as a visible light transmitter. Further, in some embodiments, the memory system 200 further includes one or more optical sensors 306 that are also exposed on the enclosure 302, e.g., via the aperture 320 of the enclosure 302. In some embodiments, the aperture 320 is split to smaller portions to contain the optical indicator(s) 304 and optical sensor(s) 306 separately. In an example, the one or more optical sensors 306 include a yellow LED used to sense visible light. Stated another way, in some embodiments, the memory system 200 includes a plurality of LEDs 124 (FIG. 1) for implementing the optical indicator(s) 304 and optical sensor(s) 306.

The electronic system 300 further includes an external optical transceiver device 126 distinct from the memory system 200. The external optical transceiver device 126 includes at least an external optical sensor 314, and the external optical sensor 314 is configured to receive a visible light signal 418 (FIG. 4) from the optical indicator(s) 304 when the external optical sensor 314 is placed in proximity to the optical indicator(s) 304. In some embodiments, the external optical transceiver device 126 further includes an external optical transmitter 316 configured to generate an external light signal. When disposed in proximity to the one or more optical sensors 306, the external optical transmitter 316 is configured to broadcast data based on the external light signal, allowing the one or more optical sensors 306 of the memory system 200 to receive the broadcast data from the external optical transmitter 316. In some embodiments, the external optical transceiver device 126 is attached to the aperture 320 of the enclosure 302 containing the optical indicator(s) 304 by a mechanical fastening structure (e.g., a spring clip), allowing the optical indicator(s) 304 in close proximity to, or in contact with, the external optical sensor 314. In some embodiments, the optical transceiver 126 includes a plurality of LEDs for implementing the external optical sensor 314 and transmitter 316.

In some embodiments, the external optical transceiver device 126 is electrically coupled to a client device 310 via a wireless or wired communication link 312, and controlled by the client device 310 to detect the visible light signal 418 and emit the external light signal. This allows the memory system 200 and the client device 310 to establish an optical communication link 128 and exchange internal activity data of the memory system 200 via the optical communication link 128. The optical communication link 128 replaces a wired communication channel relying on a wired UART connector. The aperture 320 of the one or more optical indicators 304 or sensors 306 do not create large cutouts on the enclosure 302 of the memory device 200 compared with the wired UART connector, thereby inducing no or little EMI on the memory system 200.

The memory device 200 receives a data request, which optionally originates from the client device 310 or a host device 220 of the memory device. In response to the data request, the memory device 200 obtains internal activity data 410 (FIG. 4) stored in the enclosed memory device 200, encodes the internal activity data into an electrical signal 412 (FIG. 4), and drives an optical indicator 304 with the electrical signal to generate the visible light signal 418 (FIG. 4) carrying the internal activity data of the enclosed memory device 200. In some embodiments, the external optical sensor 314 of the external optical transceiver device 126 receives the visible light signal 418, recovers the internal activity data of the memory device 200, and provides the decoded internal activity data to the client device 310. The client device 310 is configured to monitor memory access status, general memory health, and error information of the memory system 200 based on the internal activity data. In some embodiments, the data request is encoded by the optical transceiver 126 to the external light signal emitted by the external optical transmitter 316, and the memory system 200 receives the data request via the one or more optical sensors 306 arranged in proximity to the external optical transmitter 316.

In some embodiments, the enclosure 302 of the memory device 200 complies with an EDSFF used in SSDs of a server computer. In an example, the enclosure 302 of the memory device 200 has a predefined height of 76 mm, one of two predefined lengths of 112.75 mm and 142.2 mm, and one of two predefined widths of 7.5 mm and 16.8 mm. The aperture 320 is optionally defined at an end surface of the enclosure 302 defined by the predefined height and the one of two predefined widths. Alternatively, in some embodiments, the enclosure 302 of the memory device 200 includes an AIC, allowing the memory device 200 to slide into a Peripheral Component Interconnect Express (PCIe) expansion slot in a motherboard to provide a high speed connection. Additionally, in some embodiments, the enclosure 302 of the enclosed memory device 200 further includes a mechanical securing structure 318 (e.g., a sliding or flipping door, latch) configured to cover the aperture 320 and disrupt an optical path of the visible light signal. The mechanical securing structure 318 also protect internal circuitry of the memory device 200 from EMI.

Figure 4:
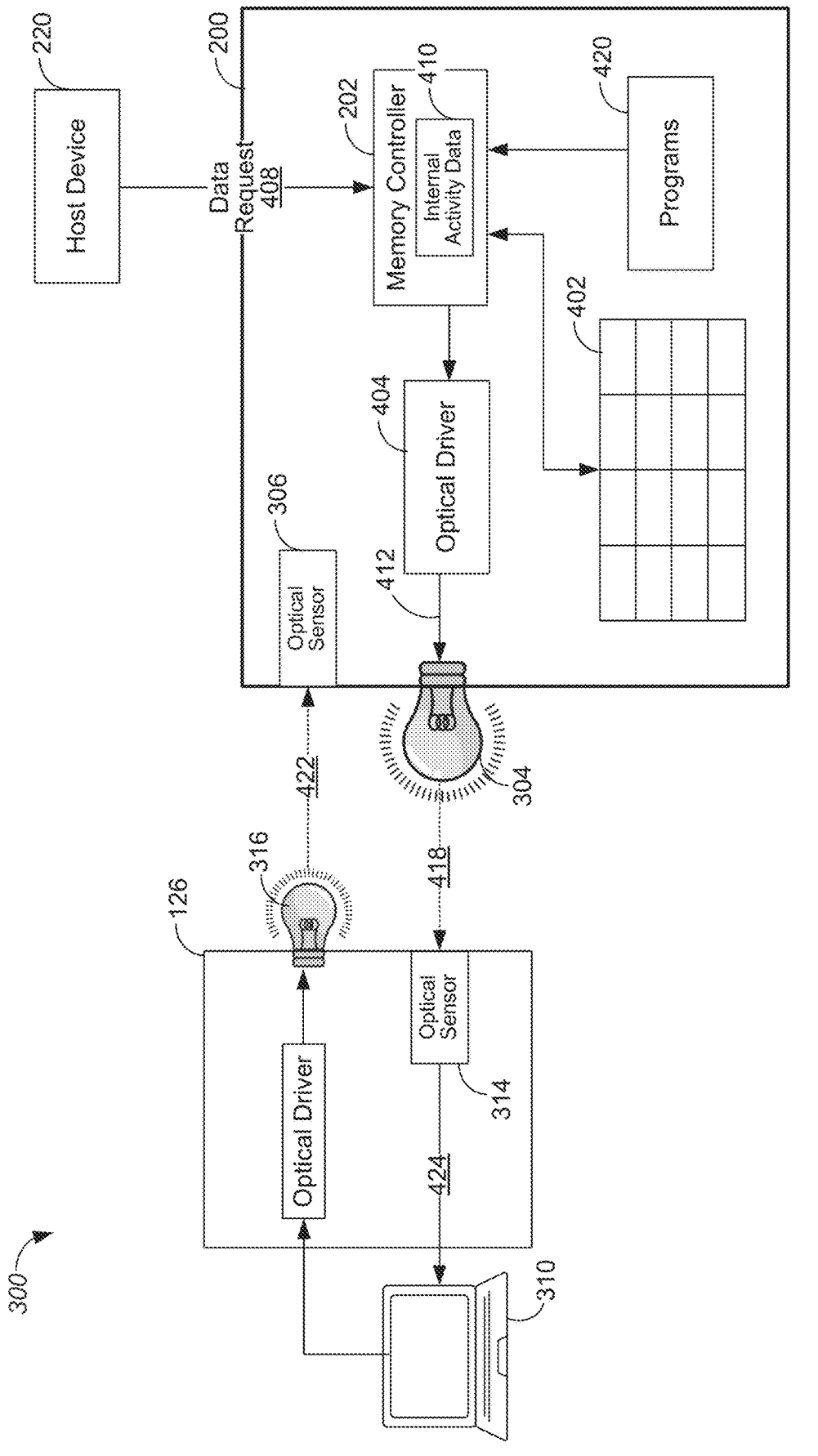
FIG. 4 a block diagram of another example electronic system that communicates data of a memory system using optical signals, in accordance with some embodiments.

FIG. 4 is a block diagram of another example electronic system 300 that communicates data of a memory system 200 using optical signals, in accordance with some embodiments. The electronic system 300 includes a memory system 200, a host device 220, an external optical transceiver device 126, and a client device 310. The memory system 200 further includes a plurality of memory cells 402, a memory controller 202, and an optical driver 404, all of which are enclosed within an enclosure 302. The memory system 200 further includes an optical indicator 304 exposed on the enclosure 302, e.g., via an aperture 320 of the enclosure 302 (FIG. 3). In an example, the optical indicator 304 includes a green LED used as a visible light transmitter. Further, in some embodiments, the memory system 200 further includes an optical sensor 306 that is also exposed on the enclosure 302, e.g., via the aperture 320 of the enclosure 302. In an example, the optical sensor 306 includes a yellow LED used to sense visible light.

The memory system 200 further includes one or more programs 420 configured for execution by the memory controller 202. The one or more programs include instructions for transmitting data via an optical communication link 128 established between the memory system 200 and the external optical transceiver device 126. The memory system

200 receives a data request 408. In response to the data request 408, the memory system 200 obtains internal activity data 410 stored in the memory system 200, codes the internal activity data 410 into an electrical signal 412, and drives the optical indicator 304 with the electrical signal 412 to generate a visible light signal 418 carrying the internal activity data 410. In some embodiments, the data request 408 is communicated from the host device 220 (e.g., a server computer installed with SSDs) to the memory system 200 and via an electrical data link distinct from the optical indicator 304. Alternatively, in some embodiments, the optical sensor 306 of the memory system detects an incoming optical signal 422 encoded with the data request 408 and converts the incoming optical signal 422 to an incoming electrical signal. The data request 408 is extracted from the incoming electrical signal.

In some embodiments, the data request 408 is received with and includes a debugging command. The memory controller 202 executes a debugging program internally, identifies error information including debugging data, and responds to the data request with the corresponding debugging data for identifying an error that occurs during debugging. In an example, the memory system 200 includes an SSD, and the internal activity data 410 carried by the visible light signal 418 includes UART information for telemetry or debugging messages from the SSD.

In some embodiments, the data request 408 includes a command selected from a group consisting of: list menu items, run DRAM pseudo random bit patterns (PRBPs), turn on/off general-purpose input/output (GPIO), read/write I2C register, Serial Peripheral Interface (SPI) read/write, test NAND, and get log. In some embodiments, in response to the data request 408 of listing menu items, the internal activity data 410 carried by the visible light signal 418 includes a list of predefined menu items. In some embodiments, in response to the data request 408 of running DRAM PRBPs, the internal activity data 410 carried by the visible light signal 418 includes information concerning whether the PRBPs are properly stored in a DRAM or whether the DRAM pseudo random bit patterns have been properly applied (e.g., to overwrite a set of memory cells 402). In some embodiments, in response to the data request 408 of controlling GPIO, the internal activity data 410 carried by the visible light signal 418 includes a state of the GPIO. In some embodiments, an I2C bus includes a synchronous, multi-master/multi-slave, packet switched, single-ended, serial communication bus, and an I2C register is configured to temporarily store data communicated via the I2C bus. In response to the data request 408 of reading or writing the I2C register, the internal activity data 410 carried by the visible light signal 418 includes a state of the I2C register. In some embodiments, an SPI is a synchronous serial communication interface specification used for short-distance communication. In response to the data request 408 for SPI read/write, the internal activity data 410 carried by the visible light signal 418 includes information of a state of the SPI, e.g., whether the SPI is busy, a current capacity of the SPI. In response to the data request 408 to test NAND, the internal activity data 410 carried by the visible light signal 418 includes information of program/erase cycles, bad memory blocks, and wear leveling of NAND memory cells of the memory system 200. In response to the data request 408 to get a log, the internal activity data 410 carried by the visible light signal 418 includes information of an event log, an error log, a telemetry log, or a memory health log.

In some embodiments, the internal activity data 410 includes telemetry data stored by the memory system 200, while the memory system 200 is processing a sequence of memory access requests including at least one of a read request and a write request. In response to the write request, memory data is written into a subset of the memory cells 402. In response to the read request, memory data is read from a subset of the memory cells 402. The internal activity data 410 includes information of the sequence of memory access requests or general health of the memory system 200 during corresponding memory accesses.

In some embodiments, the visible light signal 418 is emitted by the optical indicator 304, carrying the internal activity data 410. The visible light signal 418 is synchronized with the data request 408, such that the internal activity data 410 is provided in synchronization with the data request 408. In some embodiments, the visible light signal 418 includes a start portion (e.g., 506 in FIG. 5) having a fixed light pattern that is configured to indicate that the internal activity data 410 immediately follows the fixed light pattern. The optical sensor 314 of the optical transceiver device 126 detects the fixed light pattern, and initiates detection and analysis of the internal activity data 410 in response to detection of the fixed light pattern. In some embodiments, the internal activity data 410 of the memory system 200 is selected from a group consisting of: menu/test options, drive statistics, DRAM configuration information, device register information, and event logs. In an example, the internal activity data 410 of the memory system 200 includes one or more of: drive temperature, drive health data, and error information.

In some embodiments, the visible light signal 418 emitted by the optical indicator 304 has a predefined color (e.g., green). In some embodiments, the optical indicator 304 is controlled by the electrical signal 412 to blink at a predefined data rate that is higher than a data rate threshold. A human eye can detect flicker at 50-90 Hz while reports are showing the possibility to distinguish between steady and modulated light up to 500 Hz. In an example, the data rate threshold is 100 Hz, which is greater than 90 Hz. In another example, the data rate threshold is 600 Hz, which is greater than 500 Hz. In yet another example, the optical indicator 304 is controlled by the electrical signal 412 to blink at 10 KHz. It is also noted that although this application describes implementations having a visible light signal 418, other implementations of the memory system 200 rely on invisible light (e.g., infrared light, ultraviolet light) to communicate internal activity data 410.

Figure 5:
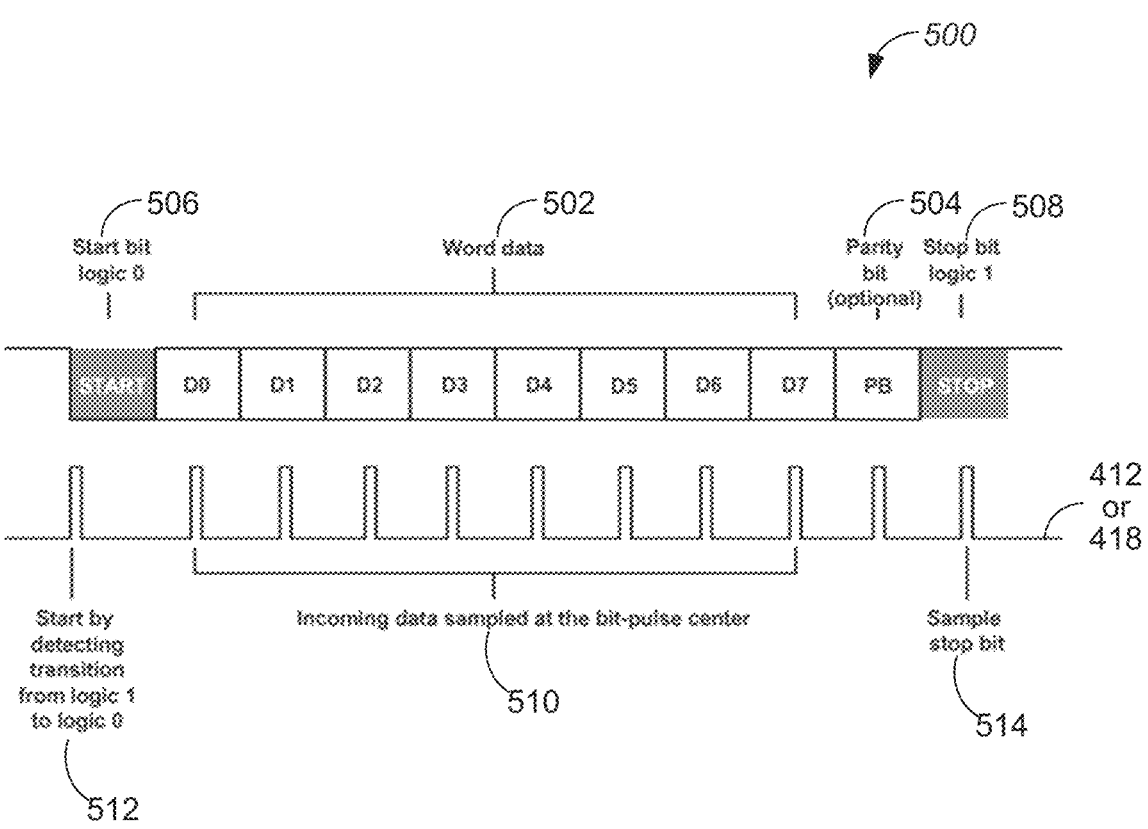
FIG. 5 a temporal diagram of a signal pattern that is communicated using a visible light signal and includes internal activity data of a memory system, in accordance with some embodiments.

FIG. 5 is a temporal diagram of a signal pattern 500 that is communicated using a visible light signal 418 and includes internal activity data 410 of a memory system 200, in accordance with some embodiments. The memory system 200 obtains internal activity data 410, codes the internal activity data 410 into an electrical signal 412, and drives the optical indicator 304 with the electrical signal 412 to generate the visible light signal 418 carrying the internal activity data 410. The signal pattern 500 includes a word data portion 502 having a plurality of data bits and corresponding to at least one character or symbol. In some embodiments, the plurality of data bits includes 8 bits (D0-D7) representing a character or symbol in a standard American Standard Code for Information Interchange (ASCII) table. In some embodiments, the plurality of data bits includes a plurality of data bit sets, and each data bit set includes 8 bits representing a respective character or symbol in the standard ASCII table. In some embodiments, the signal pattern 500 includes one or more parity bits 504. For example, the 8 bits (D0-D7) represents a first character, and is associated with a single parity bit.

In some embodiments, the signal pattern 500 includes a start portion 506, a stop portion 508, or both. The start portion 506 includes a predefined first number of bits having a predefined start pattern. The stop portion 508 includes a predefined second number of bits having a predefined stop pattern. For example, the single pattern 500 has a nominal logic level of "1" and is encoded with the start portion 506 of 4 bits of "0," the word data portion 502, the one or more parity bits 504, and the stop portion 508 of 4 bits of "1," before the signal pattern 500 is reset to the nominal logic level of "1." The start portion 506 has a fixed light pattern that is configured to indicate that the internal activity data 410 immediately follows the fixed light pattern.

In some embodiments, the electrical signal 412 includes a train 510 of electrical pulses encoded according to a signal frequency, so does the visible light signal 418 include a train of light pulses coded according to the signal frequency. The train of light pulses correspond to at least a character or symbol. Each character or symbol is coded according to an ASCII format, and corresponds to at least 8 successive signal cycles optionally with or without one or more additional parity bits. Each signal cycle corresponds to a respective binary bit of "1" or "0." In some embodiments, each character or symbol corresponds to 9 successive signal cycles including a single parity bit. In some embodiments, the visible light signal 418 starts with a first light pulse 512 within a first signal cycle, ends with a second light pulse 514 within a last signal cycle, and include 8 or more successive data signal cycles for all of one or more characters between the first and last signal cycles. In some embodiments, the visible light signal 418 includes a plurality of characters. Every two characters are separated with an extended duration in which the visible light signal is disabled. Each character starts with a first light pulse 512 within a first signal cycle, ends with a second light pulse 514 within a last signal cycle, and include 8 or more data signal cycles of the respective character between the first and last signal cycles. Every time a pulse of the train 510 of electrical pulses is applied, the optical indicator 304 is driven to emit an optical pulse of the visible light signal 418.

Referring to FIG. 5, in some embodiments, the visible light signal 418 has a nominal logic level of "0" corresponding to the optical indicator 304 being off. The start portion 506 of the visible light signal 418 includes a start pulse occurring at a rising edge of a signal cycle and stays at a low logic level of "0" for a number of signal cycles (e.g., 3 or more cycles). A plurality of signal cycles follows the start portion 506. Each signal cycle optionally includes a pulse corresponding to a respective binary bit of "1" or no pulse corresponding to a respective binary bit of "0." For each binary bit of "1," the pulse is generated in the middle of the respective signal cycle. The plurality of signal cycles is followed with a stop portion 508 having a stop pattern, e.g., a pulse having a different pulse width from that of the pulse corresponding to a respective binary bit of "1."

FIG. 6 is a flow diagram of an example method 600 of communicating data in an enclosed memory device 200 (e.g., an SSD memory device) having an optical indicator 304, in accordance with some embodiments. The enclosed memory device 200 receives (602) a data request 408. In response (604) to the data request 408, internal activity data 410 stored in the enclosed memory device 200 is obtained (606) and encoded (608) into an electrical signal 412. The optical indicator 304 is driven (610) with the electrical signal 412 to generate a visible light signal 418 carrying the internal activity data 410 of the enclosed memory device 200. In some embodiments, the enclosed memory device 200 includes a solid-state drive. In an example, the memory device 200 includes an SSD, and the visible light signal 418 includes UART information for telemetry or debugging messages from the SSD.

In some embodiments, the internal activity data 410 includes telemetry data stored by the memory device 200 while the memory device 200 is processing a sequence of memory access requests including at least one of a read request and a write request.

In some embodiments, the data request 408 is received with a debugging command. The memory device 200 generates the internal activity data 410 in response to the debugging command.

In some embodiments, the data request 408 is communicated from a host device 220 to the memory device 200 and via an electrical data link distinct from the optical indicator 304.

In some embodiments, the enclosed memory device 200 further includes (612) an optical sensor 306. Receiving the data request 408 further includes detecting (614) an incoming optical signal 422 encoded with the data request 408 by the optical sensor 306, converting (616) the incoming optical signal 422 to an incoming electrical signal, and extracting (618) the data request 408 from the incoming electrical signal.

In some embodiments, the enclosed memory device 200 includes an enclosure 302, and the enclosure 302 of the memory has a aperture 320 from which the optical indicator 304 is exposed to provide the visible light signal 418. Further, in some embodiments, the enclosed memory device 200 further includes an optical sensor 306, and the optical sensor 306 is exposed from the aperture 320 to receive an incoming light encoded with the data request 408. Alternatively, in some embodiments, the enclosure 302 of the memory includes a mechanical securing structure 318 (e.g., a sliding or flipping door, latch) configured to cover the aperture 320 and disrupt an optical path of the visible light signal 418. The mechanical securing structure 318 is configured to protect internal circuitry of the memory from EMI.

In some embodiments, the enclosed memory device 200 includes (620) an enclosure 302, and a form factor of the enclosure 302 of the enclosed memory device 200 is one of an EDSFF and an AIC.

In some embodiments, the visible light signal 418 is generated in synchronization with the data request 408.

In some embodiments, the visible light signal 418 includes a start portion having a fixed light pattern that is configured to indicate that the internal activity data 410 immediately follows the fixed light pattern.

In some embodiments, the visible light signal 418 has a predefined color, and the optical indicator 304 is controlled by the electrical signal 412 to blink at a predefined data rate that is higher than a data rate threshold.

In some embodiments, the data request 408 includes (622) a command selected from a group consisting of: list menu items, run DRAM pseudo random bit patterns, turn on/off GPIOs, read/write I2C register, SPI read/write, test NAND, and get log.

In some embodiments, the internal activity data 410 of the memory device is selected (624) from a group consisting of: menu/test options, drive statistics, DRAM configuration information, device register information, and event logs. Further, in some embodiments, the internal activity data 410 of the memory device includes one or more of: drive temperature, drive health data, and error information.

In some embodiments, the visible light signal 418 includes a train of light pulses coded according to a signal frequency (e.g., 100 Hz, 600 Hz). Each character is coded according to an ASCII format, and corresponds to at least 8 successive signal cycles.

In some embodiments, an external optical sensor 314 (FIG. 3) detects the visible light signal 418 and generates an electrical data signal 424 (FIG. 4). The internal activity data 410 is extracted from the electrical data signal 424.

It should be understood that the particular order in which the operations in FIG. 6 have been described are merely exemplary and are not intended to indicate that the described order is the only order in which the operations could be performed. One of ordinary skill in the art would recognize various ways to communicate data during debugging. Additionally, it should be noted that details of other processes described above with respect to FIGS. 1-5 are also applicable in an analogous manner to method 600 described above with respect to FIG. 6. For brevity, these details are not repeated here.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A method for data communication, comprising:

at a memory device including an optical indicator, wherein the memory device is coupled to an optical universal asynchronous receiver/transmitter (UART) link via the optical indicator:

obtaining internal activity data generated by the memory device;

encoding the internal activity data into an electrical signal including a train of electrical pulses;

driving the optical indicator with the electrical signal to generate a light signal carrying the internal activity data; and communicating the light signal carrying the internal activity data via the optical UART link;

wherein the memory device includes, and is enclosed in, an enclosure, and the enclosure has an aperture from which the optical indicator is exposed to provide the light signal, the light signal including a visible light signal; and wherein a size of the aperture is smaller than a predefined size threshold that satisfies an electromagnetic interference safety criterion.

2. The method of claim 1, wherein the optical UART link has a direction along a line of sight of the optical indicator, and the optical indicator includes a light emitting diode (LED).

3. The method of claim 1, further comprising:

in response to detection of an error of the memory device, generating the internal activity data including debugging data associated with the error.

4. The method of claim 3, further comprising:

receiving a data request including a debugging command;

in response to the debugging command, executing a debugging program, wherein the error of the memory device is detected during the course of executing the debugging program.

5. The method of claim 1, wherein the memory device further includes a mechanical securing structure configured to cover the aperture, disrupt an optical path of the light signal, and suppress electromagnetic interference.

6. The method of claim 5, wherein the mechanical securing structure includes one of a sliding door, a flipping door, and a latch structure.

7. The method of claim 1, wherein the memory device further includes an optical sensor, and the optical sensor is exposed to receive an incoming light encoded with a data request via the optical UART link, the optical sensor including an LED, the optical UART link being bidirectional.

8. The method of claim 7, further comprising:

detecting an incoming optical signal encoded with the data request via the optical sensor;

converting the incoming optical signal to an incoming electrical signal; and extracting the data request from the incoming electrical signal.

9. The method of claim 1, further comprising:

receiving a data request from a host device and via an electrical data link distinct from the optical UART link.

10. The method of claim 1, further comprising:

detecting the light signal and generating an electrical data signal by an external optical sensor; and extracting the internal activity data from the electrical data signal.

11. The method of claim 1, wherein the internal activity data are generated in response to a command selected from a group consisting of: list menu items, run DRAM pseudo random bit patterns, turn on/off GPIOs, read/write I2C register, SPI read/write, test NAND, and get log.

12. A memory device, comprising:

a memory controller;

an optical indicator, wherein the memory device is coupled to an optical universal asynchronous receiver/transmitter (UART) link via the optical indicator; and one or more programs configured for execution by the memory device, the one or more programs comprising instructions for:

obtaining internal activity data generated by the memory device;

encoding the internal activity data into an electrical signal including a train of electrical pulses;

driving the optical indicator with the electrical signal to generate a light signal carrying the internal activity data; and communicating the light signal carrying the internal activity data via the optical UART link;

wherein the memory device includes, and is enclosed in, an enclosure, and the enclosure has an aperture from which the optical indicator is exposed to provide the light signal, the light signal including a visible light signal; and wherein a size of the aperture is smaller than a predefined size threshold that satisfies an electromagnetic interference safety criterion.

13. The memory device of claim 12, wherein the memory device includes an enclosure, and a form factor of the enclosure of the memory device is one of an Enterprise and Datacenter Standard Form Factor and an Add-In Card (AIC).

14. The memory device of claim 12, wherein the internal activity data are generated in response to a command selected from a group consisting of: list menu items, run DRAM pseudo random bit patterns, turn on/off GPIOs, read/write I2C register, SPI read/write, test NAND, and get log.

15. The memory device of claim 12, wherein the internal activity data of the memory device includes one or more of: menu/test options, drive statistics, DRAM configuration information, device register information, event logs, drive temperature, drive health data, and error information.

16. The memory device of claim 12, wherein the memory device further includes an optical sensor, and the optical sensor is exposed to receive an incoming light encoded with a data request via the optical UART link, the optical sensor including an LED, the optical UART link being bidirectional.

17. An electronic system, comprising:

a controller;

an optical indicator, wherein the electronic system is coupled to an optical universal asynchronous receiver/transmitter (UART) link via the optical indicator, and one or more programs configured for execution by the controller, the one or more programs comprising instructions for:

obtaining internal activity data generated by the electronic system;

encoding the internal activity data into an electrical signal including a train of electrical pulses;

driving the optical indicator with the electrical signal to generate a light signal carrying the internal activity data; and communicating the light signal carrying the internal activity data via the optical UART link;

wherein the electronic system includes, and is enclosed in, an enclosure, and the enclosure has an aperture from which the optical indicator is exposed to provide the light signal, the light signal including a visible light signal; and wherein a size of the aperture is smaller than a predefined size threshold that satisfies an electromagnetic interference safety criterion.

18. The electronic system of claim 17, wherein the light signal includes a header portion having a fixed light pattern that is configured to indicate that the internal activity data immediately follows the fixed light pattern.

19. The electronic system of claim 17, wherein the light signal has a predefined color, and the optical indicator is controlled by the electrical signal to blink at a predefined data rate that is higher than a data rate threshold.

20. The electronic system of claim 19, wherein:

the light signal includes a train of light pulses coded according to a signal frequency; and each character is coded according to an ASCII format, and corresponds to at least 8 successive signal cycles.

\* \* \* \* \*